United States Patent [19]

Dooley

[11] Patent Number: 5,303,815
[45] Date of Patent: Apr. 19, 1994

[54] CONVEYOR RACK SYSTEM

[76] Inventor: Richard A. Dooley, 400 S. Westwood Ave., Toledo, Ohio 43609

[21] Appl. No.: 16,952

[22] Filed: Feb. 12, 1993

Related U.S. Application Data

[63] Continuation-in-part of Ser. No. 965,866, Oct. 23, 1992, Pat. No. 5,226,525.

[51] Int. Cl.[5] ............................................. B65G 17/32
[52] U.S. Cl. .................................. 198/680; 198/485.1; 105/149
[58] Field of Search ................. 198/377, 465.4, 475.1, 198/474.1, 485.1, 486.1, 680; 105/149, 149.1, 149.2

[56] References Cited

U.S. PATENT DOCUMENTS

| 2,783,962 | 3/1957 | Lyon | 198/486.1 |
| 2,821,289 | 1/1958 | Castagnoli et al. | 198/680 |
| 5,000,309 | 3/1991 | Dooley | 198/680 |
| 5,226,525 | 7/1993 | Dooley | 198/680 |

FOREIGN PATENT DOCUMENTS

| 0947010 | 8/1982 | U.S.S.R. | 198/680 |
| 0947011 | 8/1982 | U.S.S.R. | 198/680 |

Primary Examiner—D. Glenn Dayoan
Attorney, Agent, or Firm—Allen D. Gutchess, Jr.

[57] ABSTRACT

A conveyor has an overhead conveyor rail with a horizontal portion and an angled portion. A receptacle is carried by supports below the rail with the receptacle positioned transversely to the rail. A two-piece rack hanger has an upper part with an upper angular end portion pivotally connected to the receptacle by a bracket. The hanger has a lower part affixed to a rack for parts or articles and a pivot connects the lower part and the upper part of the hanger. The pivot is separable so that the lower part of the hanger and the rack can be separated from the upper part of the hanger. Stops are associated with the receptacle and upper angular end portion of the hanger to limit transverse movement of the racks as they move on the angled portion of the conveyor. When the racks reach a limited transverse position, they are held in horizontal dispositions by the pivot between the lower and upper parts of the hanger.

20 Claims, 2 Drawing Sheets

CONVEYOR RACK SYSTEM

This application is a continuation-in-part of my co-pending patent application, Ser. No. 965,866, filed Oct. 23, 1992, now U.S. Pat. No. 5,226,525 patented Jul. 13, 1993.

BACKGROUND OF THE INVENTION

This invention relates to a conveyor having rack hangers with part-carrying racks which move to predetermined transverse positions when the racks are below angled portions of the conveyor and then pivot to maintain horizontal dispositions.

The conveyor can be of the monorail type which moves racks or frames of parts or articles supported below the rail along a predetermined path. The path typically extends through cleaning and/or painting and baking operations for the parts. Since the parts are usually cleaned or coated from both sides, the part racks must be positioned parallel to the path along which they move so that opposite surfaces of the parts can be equally treated from both sides.

The monorail conveyors typically move the parts along horizontal portions of the path as well as angular ones when the parts are moved between floors or different levels of operation. When the parts move along the angled portions of the path, the racks must not touch one another, which, of necessity, requires that the racks be spaced apart a substantial distance when on the horizontal portions of the predetermined path. Heretofore,, to avoid contact of adjacent racks during forty-five degree ascending and descending portions of the path, for example,, the racks typically were spaced apart on the horizontal portions of the path a distance equal to one and one-half times the rack width.

The unique conveyor design disclosed in my U.S. Pat. No. 5,000,309, issued Mar. 19, 1991, causes the part racks or frames to automatically rotate about upright axes between positions in which they are parallel to the predetermined path when the racks are below horizontal portions of a rail of the conveyor to positions in which they are transverse to the path when the racks are below angled, ascending or descending, portions of the conveyor rail. Consequently, the racks can be almost in contact when positioned parallel to the predetermine path and below the horizontal portion of the conveyor rail. Therefore, a substantially continuous wall of parts can be presented as they pass through cleaning, painting and baking operations, for example. The throughput capacity of an existing operation including a monorail conveyor having typically forty-five degree ascending and descending portions can be increased substantially fifty percent, maintaining the same processing cycle times and changing only the feed rates of coating materials applied to the parts. The conveyor design also enables the racks or frames to be more accurately positioned parallel to the direction of the predetermined path along which they move, which is important when precise spacing between the parts and spray gun nozzles, for example, is required for uniform coating or finishing.

SUMMARY OF THE INVENTION

A conveyor in accordance with the invention includes an overhead rail having at least one generally horizontal portion and one angled portion which carries the parts along ascending or descending portions of a predetermined path. The overhead rail typically has roller chains below which pivot links extend. A load bar or link is pivotally connected to the two pivot links and carries an elongate receptacle or socket having an axis lying in a plane which is perpendicular to both the conveyor rail and the path along which the articles are moved. The axis of the receptacle also is positioned to form a predetermined pivot angle relative to an intersecting horizontal line which lies in that plane when the receptacle is below a horizontal portion of the conveyor rail.

In accordance with the invention, the conveyor also has a two-piece rack hanger With a pivot therebetween. The rack hanger suspends an article rack or frame below the conveyor rail. The upper part of the rack hanger has an elongate upright portion which is straight and an angular end portion forming an acute angle with a vertical intersecting line, this angle being complementary to the angle which the receptacle axis forms with its horizontal line, the two angles substantially equalling ninety degrees.

A U-shaped bracket having upwardly extending legs is affixed to the angular end portion of the upper part of the rack hanger and has holes in the legs. A fastener extends through the receptacle with the legs at either end thereof and also extends through the holes in the legs to pivotally connect the bracket and the upper part of the hanger relative to the receptacle. The load link or bar has stops affixed thereto which engage the bracket and limit the extent of the transverse movement of the racks as they reach an angled portion of the conveyor. After the rack reaches the desired transverse position as determined by the stops, the pivot of the rack hanger then enables the rack to maintain a horizontal disposition as it further ascends or descends the angled portion of the conveyor. The pivot is formed by a pin at the lower end of the elongate upright portion of the upper part of the rack hanger and by two hooks which engage the pin on either side of the upright portion. The hooks are affixed to a vertical elongate member, the lower end of which is connected to the part rack.

The transverse movement of the racks is achieved in the same manner disclosed in my U.S. Pat. No. 5,000,309. When the hangers are moved to a position below the angled portion of the rail, is the axis of the elongate receptacle continues to lie in a plane which is perpendicular to both the conveyor rail and the predetermined path of the parts and continues to form the same pivot angle with an intersecting horizontal line which lies in that plane. The axis of the upper angular portion of the hanger remains parallel to the axis of the receptacle. However, the upright portion of the hanger remains substantially vertical under the force of gravity with the result that the upper angular portion of the hanger turns relative to the receptacle. Consequently the upright portion turns relative to the path of predetermined movement of the parts with the result that the rack, which has been parallel to the direction of movement of the parts, now is turned transversely to the direction of movement. With this arrangement, the racks are automatically turned transversely to the path Of the racks as they ascend or descend the angled portions of the conveyor rail. This is accomplished without the need for any special cams, gears or the like to cause such rotation of the racks.

The transverse movement is limited by the aforementioned stops. These can be in the form of elongate bars affixed to the load link and engage the U-shaped bracket to determine the maximum transverse movement of the rack.

After the transverse movement of the rack is stopped, which is early on the angled portion of the conveyor rail, the elongate upright portion of the upper part of the rack hanger then assumes an angle to the vertical and is no longer upright as the racks continue to move up or down the angled portion of the conveyor rail, To maintain the horizontal disposition of the rack, the pivot then enables the rack and the lower part of the rack hanger to maintain position, with the lower part of the hanger remaining vertical even though the elongate upright portion of the upper part of the rack is no longer in a vertical position. The pivot preferably includes a pin at the lower end of the upright portion of the upper part of the rack hanger and hooks at the upper end of the lower part of the rack hanger. This is a simple arrangement yet enables the lower part of the rack hanger to be separated, along with the rack from the upper part of the hanger.

By limiting the degree of transverse movement of the racks, they stay closer to the plane of the monorail and thereby will not interfere with physical objects adjacent the rail which could otherwise occur if long or wide racks are employed which move to more extreme transverse Positions.

OBJECT OF THE INVENTION

It is, therefore, a principal object of the invention to provide a conveyor for racks of parts which causes the racks to turn transversely to their path of movement to predetermined transverse positions when the racks are carried along ascending or descending paths.

Another object of the invention is to provide a conveyor which moves racks to predetermined transverse positions and yet maintains their position relative to the horizontal when the racks are moved along ascending or descending paths. dr

BRIEF DESCRIPTION OF THE DRAWINGS

Many other objects and advantages of the invention will be apparent from the following detailed description of a preferred embodiment thereof, reference being made to the accompanying drawings, in which.

DETAILED DESCRIPTION OF THE PREFERRED EMBODIMENT

Figure 1:
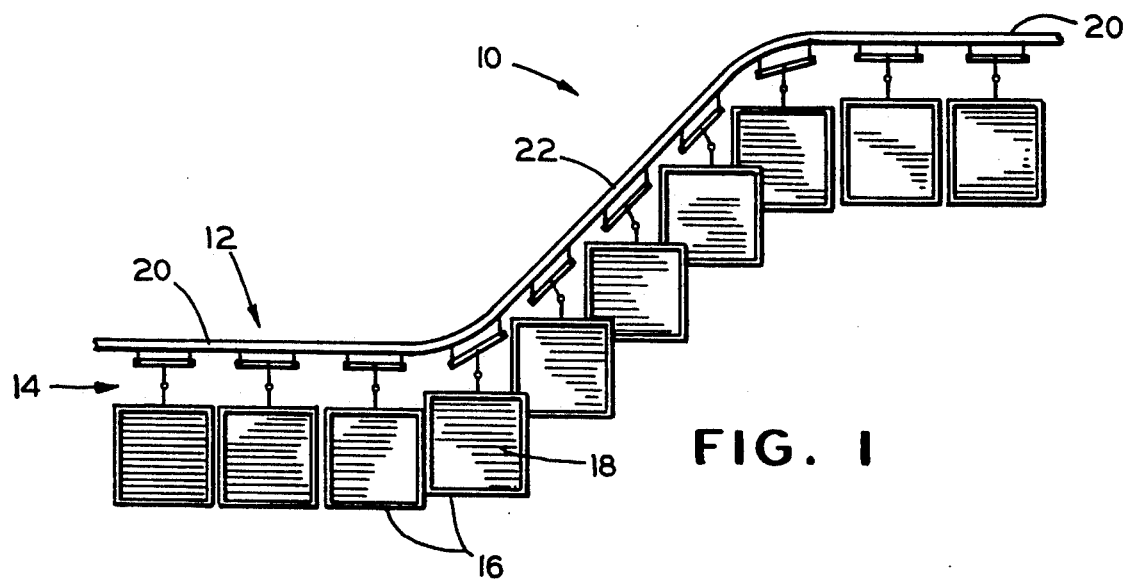
FIG. 1 is a schematic view in elevation of a conveyor in accordance with the invention.
Figure 2:
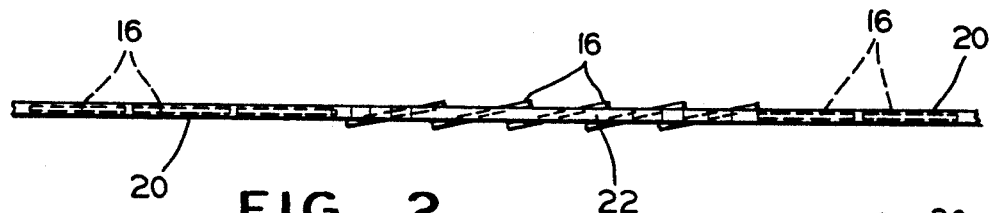
FIG. 2 is a schematic plan view of the conveyor of FIG. 1.
Figure 3:
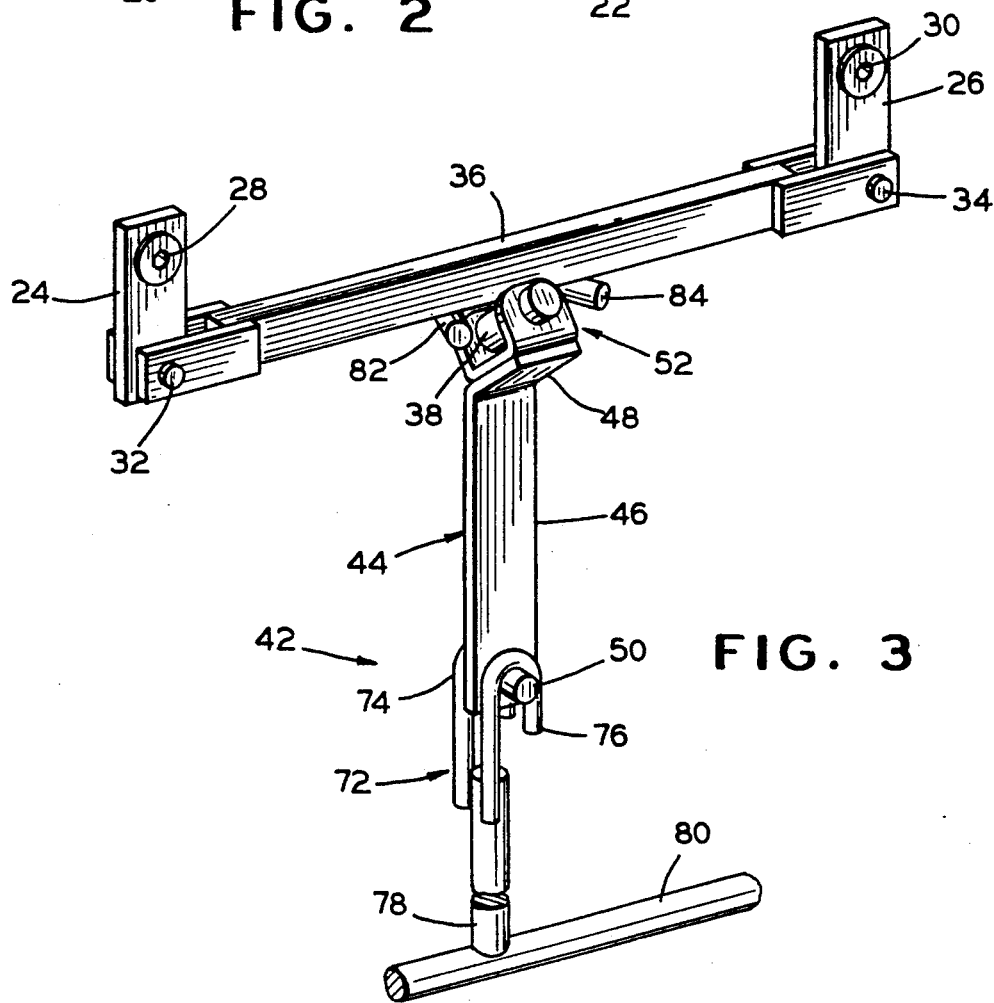
FIG. 3 is a fragmentary view in perspective of a rack support assembly in accordance with the invention.

Referring to FIGS. 1 and 2, a conveyor embodying the invention is indicated at 10 and includes an overhead monorail 12 and rack support assemblies 14 for carrying racks or frames 16 for parts or articles 18. The rail 12 has horizontal portions 20 and angled portions 22, one being shown. Operations on the parts, such as cleaning, coating, and baking, are usually performed along the horizontal portions 20 of the monorail 12 and the parts 18 and racks 16 are moved between different levels or floors along the angled portions 22. The racks 16 must be parallel to their movement along a predetermined path, as determined by the monorail 12, when they are on the horizontal portions 20 thereof. In this manner, the parts 18 can be sprayed, etc. equally from both sides. Heretofore, the racks 16 had to be spaced apart a sufficient distance that the edges did not contact one another when they were on the angled portion of the conveyor. However, when the racks are turned transversely on the angled portion 22, they can be virtually in contact when on the horizontal portions 20. This close spacing has a number of advantages as discussed previously.

One of the rack support assemblies 14 is shown in FIG. 3-7. Referring to pig. 3, the support assembly includes two pivotal links 24 and 26 which engage a roller chain (not shown) carried by the monorail 12 and moved along the monorail with the chain which is powered by suitable drive means located in a suitable location along the monorail, as is well known in the art. The pivotal links 24 and 26 have upper openings 28 and 30 which are connected to the roller chain by suitable Pins (not shown). The lower ends of the pivotal links have openings through which bolts 32 and 34 extend to pivotally connect the links to a main load bar or link 36.

Figure 5:
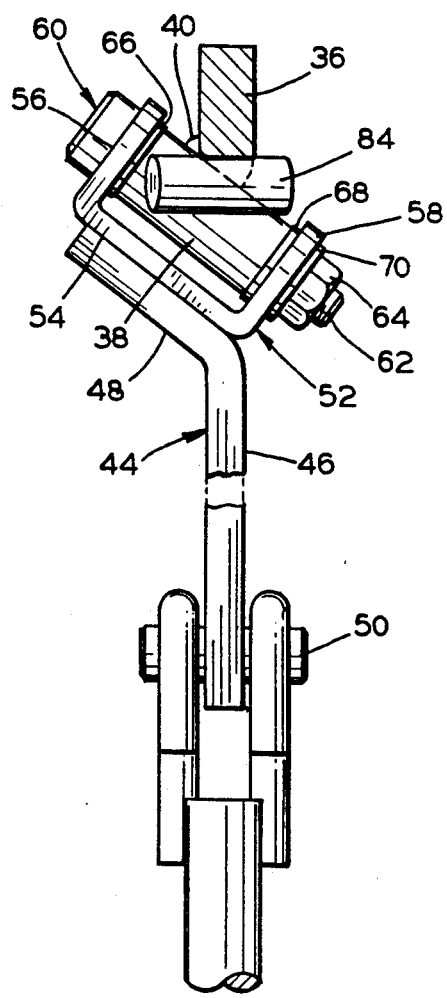
FIG. 5 is a fragmentary view in elevation of the rack support assembly.

An elongate receptacle or socket 38 is affixed to an intermediate portion of the load link 36 at a predetermined angle, as by welds 40 (FIG. 5). The receptacle can be affixed anywhere along the length of the bar to provide suitable spacing for the parts racks 16, according to the particular installation. The receptacle 38 has an axis lying in a plane which is perpendicular to both the conveyor rail 12 and the predetermined path along which the racks are moved. The axis of the receptacle also is positioned to form a predetermined pivot angle relative to ar, intersecting horizontal or vertical line which is perpendicular to the rail and path. The pivot angle can be changed according to the slope of the angled portion 22 of the conveyor and the size and shape of the rack and parts, but is always greater than zero.

A two-piece rack hanger 42 is located below the load link 36. An upper part 44 of the hanger 42 includes an elongate upright portion 46, an upper angular end Portion 48, and a pivot pin 50 located at the lower end of the upright portion 46. The angular end portion 48 forms the same pivot angle with a horizontal line as the axis Of the receptacle 38. The upper part 44 of the hanger is connected to the receptacle 38 so as to pivot or rowel relative thereto. For this purpose, a U-Shaped bracket 52 is affixed to tile upper angular end portion 48 of the hanger part 44. Specifically, a web 54 is welded to the end portion 48. The bracket 52 also has two legs 56 and 58 extending from the web 54 and which extend over both ends of the receptacle 38. A suitable fastener 60 shown in the form of a socket head shoulder bolt extends through a hole in the leg 56, the receptacle 38, and a hole in the leg 58 where it terminates in a threaded end 62 on which a suitable nut 64 is threaded. Suitable bushings 66 and 68 are located on the shoulder bolt 60 at the bracket legs 56 arid 58. A washer 70 is also located between the leg 58 and the nut 64.

A lower part 72 of the hanger 42 has two upper inverted hook 74 and 76 which engage the pin 50 at the lower end of the hanger part 44. The lower ends of the hooks 74 and 76 are affixed to an elongate supporting member 78, the lower of which is affixed to a central portion of an upper frame member 80 of the rack 16. This pivoting arrangement enables the lower part 72 of the hanger 42 to be separated from the upper part 44 along with the rack 16.

As the rack support assembly 14 and the rack 16 begin to move up or down the angled portion 22 of the conveyor rail, the rack hanger 42 and the rack 16 turn to move the rack to a transverse position, as described previously. With wide racks and narrow parts, a transverse movement of only ten to fifteen degrees is all that is necessary for the racks and parts to clear one another when travelling p or dow, the angled portion 22. The parts 18, by way Of example, call be large flat panels to be coated. In many instances, greater transverse movement of the racks is immaterial. However, particularly with wider racks, excess transverse movement can cause the racks to interfere with physical objects adjacent the rail or with the edges of openings in ceilings or floors through which the racks move on the conveyor.

Figure 6:
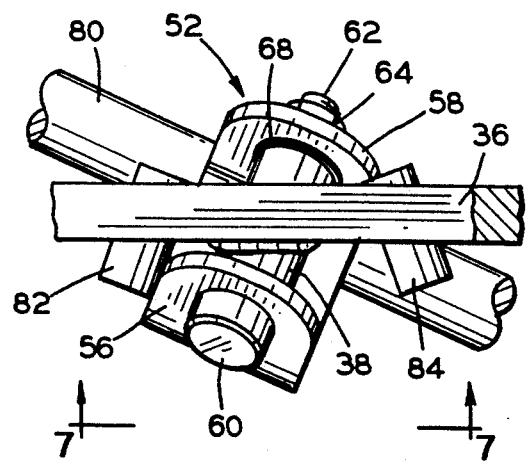
FIG. 6 is a view similar to FIG. 4 but showing the components in different Positions.
Figure 7:
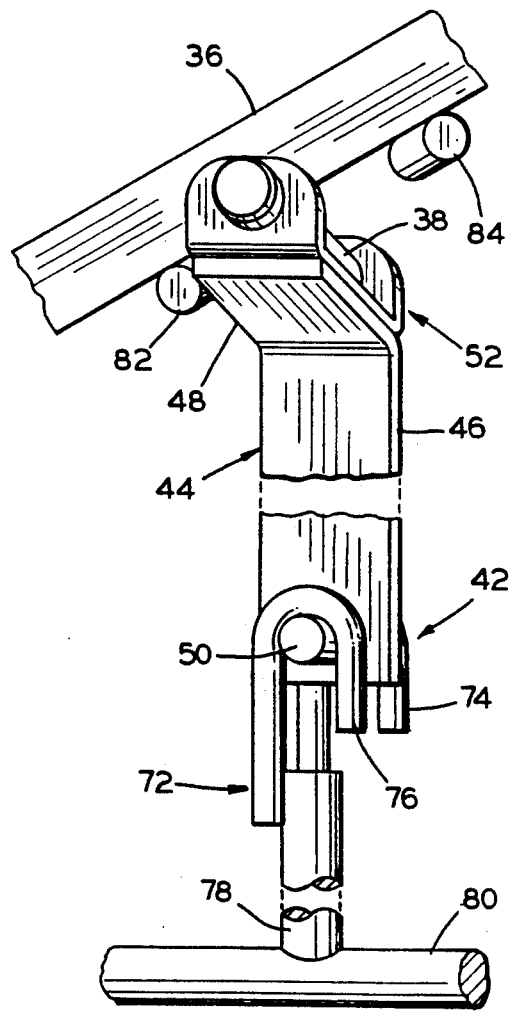
FIG. 7 is a view in elevation taken along the line 7—7 of FIG. 6.

To limit the transverse movement of the racks 16, stop means are provided for the rack hanger 42. For this purpose, two stop members or bars 82 and 84 are located on each side of the receptacle 38. In this instance, the stop bars are affixed, as by welds, to the load link 36. The bracket 52 moved between the stop bars 82 and 84 as the hanger 42 pivots to move the rack 16 transversely. The maximum transverse movement of the rack is determined when the bracket 52 contacts one of the stop bars 82 and 84. FIGS. 6 and 7 show the frame member 80 of the rack 16 in its maximum transverse position which is reached when the rack support assembly 14 and the rack 16 begin movement up the angles portion 22 of the conveyor. This transverse position is sufficient for the wide rack 16 with the narrow parts 18 to clear one another on the angled portion of the conveyor, as shown in FIGS. 1 and 2.

Figure 4:
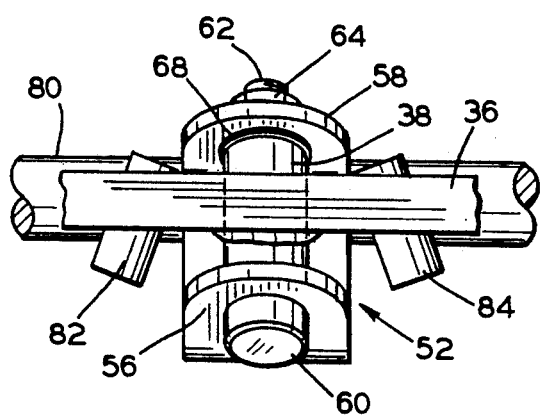
FIG. 4 is an enlarged top view of the rack support assembly of FIG. 3.

As the support assemblies 14 and the rack 16 reach the full angular position of the angles portion 22 of the conveyor, with the racks in their maximum transverse positions, the pivot achieved by the hooks 74 and 76 and the pin 50 come into play to enable the lower part 72 Of the hanger 42 and the rack 16 to maintain the same horizontal position as when below the horizontal portions 20 of the conveyor. Thus, the lower part 72 remains vertical and the rack 16 remains in a horizontal disposition. When the hanger assemblies and the racks reach the upper end of the angles portion 22, the racks then move back to the coplanar relationship as sown in FIGS. 1 and 2, with the bracket 52 being centrally located between the stop bars 82 and 84, as shown in FIGS. 4 and 5.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. A conveyor comprising an overhead conveyor rail having a generally horizontal portion and an angled portion, a generally cylindrical receptacle, a load bar movably carried below said rail and positioning said receptacle transversely to said rail with an axis of said receptacle forming a pivot angle with an intersecting horizontal line which is perpendicular to the rail, a rack hanger having an upper part with an upper angular end portion, said upper angular end portion carrying a bracket, fastener means connecting said bracket and said receptacle to enable said bracket to pivot relative to said receptacle, said hanger having a separate, lower part with a lower end connected to a rack, stop means associated with said load bar and said bracket for limiting transverse movement of said rack, and pivot means pivotally connecting an upper end portion of said lower part and a lower end portion of said upper part, said pivot means being separable to enable separation of said lower part of said rack hanger from said upper part.

2. A conveyor according to claim I wherein said stop means comprises two stop members affixed to said load bar on either side of said bracket and engagable with said bracket to limit pivotal movement of said bracket and said upper part of said hanger.

3. A conveyor according to claim I wherein said bracket is U-shaped and has legs extending over ends of said receptacle, and said fastener means extending through said legs and said receptacle.

4. A conveyor according to claim 1 wherein said pivot means comprises a pin carried by said upper part of said hanger and two hooks on said lower part of said hanger engagable with said pin.

5. A conveyor according to claim 1 wherein said pivot means comprises a pin carried by a lower portion of said upper part of said hanger, and said lower part of said hanger has two inverted books extending upwardly therefrom and engagable with said pin.

6. A conveyor according to claim 5 wherein said upper part of said hanger has an elongate portion extending downwardly from said angular portion, said pin is carried by a lower end portion of said elongate portion, and said hooks engage said pin on each side of said lower end portion.

7. A conveyor comprising an overhead conveyor rail having a generally horizontal portion and an angled portion, a first pivotal link carried below said rail, a second pivotal link carried below said rail, a load bar connecting said first and second pivotal links, said pivotal links and said load bar being movable in a linear path below said rail, a receptacle carried by said load bar between said first and second pivotal links and positioned transversely to the direction of movement of said load bar, said receptacle having an axis forming a pivot angle with a horizontal intersecting line which is perpendicular to the rail, a rack hanger having an upper part and a separable lower part, first means pivotally connecting an upper end portion of said upper part with said receptacle for pivotal movement with respect thereto, stop means carried by said load bar for limiting pivotal movement of said upper part of said hanger, said lower part of said hanger being connected to a rack, and second means pivotally connecting said lower part and said upper part of said hanger and being separable to enable separation of said lower part and said upper part.

8. A conveyor according to claim 7 wherein said first pivotal connecting means comprises a generally U-shaped bracket affixed to said upper end portion of said upper part, said bracket having legs extending over each end of said receptacle, and fastener means extending through said receptacle and through said legs of said bracket.

9. A conveyor according to claim 8 wherein said stop means comprises two stop members affixed to said load bar on either side of said bracket and engagable with said bracket to limit pivotal movement of said bracket and said upper part of said hanger.

10. A conveyor according to claim 7 wherein said second pivot means comprises a pin carried by said upper part of said hanger and two hooks on said lower part of said hanger engagable with said pin.

11. A conveyor according to claim 7 wherein said second pivot means comprises a pin carried by said lower portion of said upper part of said hanger, and said lower part of said hanger has two inverted hooks extending upwardly therefrom and engagable with said pin.

12. A conveyor according to claim 11 wherein said upper part of said hanger has an elongate portion extending downwardly from said angular portion, said pin is carried by a lower end portion of said elongate portion, and said hooks engage said pin on each side of said lower end portion.

13. A conveyor comprising an overhead conveyor rail having a generally horizontal portion and an angled portion, a receptacle support means movably carried below said rail and positioning said receptacle transversely to said rail with an axis of said receptacle forming an angle greater than zero with an intersecting horizontal line, a two-piece rack hanger having separable upper and lower parts with the upper part having an upper angular end portion, first means pivotally connecting said angular end portion to said receptacle for pivotal movement with respect thereto, stop means for limiting transverse pivotal movement of said rack hanger relative to said conveyor rail, and second means pivotally connecting an upper end portion of said lower part and a lower end portion of said upper part to enable said lower part to remain in a vertical disposition, said second pivot means being separable to enable separation of said lower part and said upper part.

14. A conveyor according to claim 13 wherein said support means comprises two pivotal links, a load bar connects said links, and said receptacle is affixed to an intermediate portion of said load bar.

15. A conveyor according to claim 14 wherein said stop means comprises two stop members affixed to said load bar and positioned on each side of said receptacle.

16. A conveyor according to claim 15 wherein said first connecting means comprises a bracket engagable with said stop members to limit transverse movement of said hanger rack.

17. A conveyor according to claim 16 wherein said bracket is U-shaped and has legs extending over ends of said receptacle, and said fastener means extends through said legs and said receptacle.

18. A conveyor according to claim 13 wherein said second pivot means comprises a pin carried by said upper part of said hanger and two hooks on said lower part of said hanger engagable with said pin.

19. A conveyor according to claim 13 wherein said second pivot means comprises a pin carried by a lower portion of said upper part of said hanger, and said lower part of said hanger has two inverted hooks extending upwardly therefrom and engagable with said pin.

20. A conveyor according to claim 19 wherein said upper part of said hanger has an elongate portion extending downwardly from said angular portion said pin is carried by a lower end portion of said elongate portion, and said hooks engage said pin on each side of said lower end portion.

* * * * *

UNITED STATES PATENT AND TRADEMARK OFFICE
CERTIFICATE OF CORRECTION

PATENT NO. : 5,303,815
DATED : April 19, 1994
INVENTOR(S) : Richard A. Dooley

Page 1 Of 3

It is certified that error appears in the above-identified patent and that said Letters Patent is hereby corrected as shown below:

Column 1, line 34, change ",," to --,--.

Column 1, lines 46-47, change "predetermine" to --predetermined--.

Column 2, line 13, change "With" to --with--.

Column 2, line 45, delete "is".

Column 2, line 55, after "Consequently" insert --,--.

Column 2, line 62, change "Of" to --of--.

Column 3, line 8, change "," to --.--.

Column 3, line 26, change "Positions" to --positions--.

Column 3, line 38, delete "dr".

Column 3, line 56, change "Positions" to --positions--.

Column 4, line 17, change "pig." to --FIG.--.

Column 4, line 20, after "chain" insert --,--.

Column 4, line 24, change "Pins" to --pins--.

Column 4, line 38, change "ar," to --an--.

Column 4, line 46-47, change "Portion" to --portion--.

UNITED STATES PATENT AND TRADEMARK OFFICE
CERTIFICATE OF CORRECTION

PATENT NO. : 5,303,815
DATED : April 19, 1994
INVENTOR(S) : Richard A. Dooley

It is certified that error appears in the above-identified patent and that said Letters Patent is hereby corrected as shown below:

Column 4, line 50, change "Of" (first occurrence) to --of--.

Column 4, line 52, change "rowel" to --rotate--.

Column 4, line 52, change "U-Shaped" to --U-shaped--.

Column 4, line 52, change "tile" to --the--.

Column 4, line 63, change "arid" to --and--.

Column 4, line 66, change "hook" to --hooks--.

Column 5, line 13, change "p" to --up--.

Column 5, line 13, change "dow" to --down--.

Column 5, line 14, change "Of" to --of--.

Column 5, line 14, change "call" to --can--.

Column 5, line 33, change "angles" to --angled--.

Column 5, line 39, change "angles" to --angled--.

Column 5, line 42, change "Of" to --of--.

Column 5, line 48, change "angles" to --angled--.

Column 5, line 49, change "sown" to --shown--.

UNITED STATES PATENT AND TRADEMARK OFFICE
CERTIFICATE OF CORRECTION

PATENT NO. : 5,303,815
DATED      : April 19, 1994
INVENTOR(S): Richard A. Dooley Page 3 Of 3

It is certified that error appears in the above-identified patent and that said Letters Patent is hereby corrected as shown below:

Column 6, line 11, claim 2, line 1, change "I" to --1--.

Column 6, line 16, claim 3, line 1, change "I" to --1--.

Column 7, line 19, claim 13, line 3, after "receptacle" insert --,--.

Signed and Sealed this

Sixteenth Day of August, 1994

Attest:

BRUCE LEHMAN

*Attesting Officer*          Commissioner of Patents and Trademarks